United States Patent [19]

Popov et al.

[11] Patent Number: 5,024,124
[45] Date of Patent: Jun. 18, 1991

[54] ELECTRIC DRIVE WITH MANUAL DOUBLER

[76] Inventors: Nikolai P. Popov, prospekt Ispytatelei, 31,korpus 1, kv. 507; Andrei D. Plotnikov, Prospekt Nastavnikov,25,korpus 3,kv. 101; Grigory N. Klotsvog, Ulitsa Gavanskava, 11, kv. 43, all of, Leningrad, U.S.S.R.

[21] Appl. No.: 449,870
[22] PCT Filed: Jul. 27, 1988
[86] PCT No.: PCT/SU88/00153
§ 371 Date: Dec. 15, 1989
§ 102(e) Date: Dec. 15, 1989
[87] PCT Pub. No.: WO90/01127
PCT Pub. Date: Feb. 8, 1990

[51] Int. Cl.$^5$ .................................. F16K 31/143
[52] U.S. Cl. .................................................. 74/625
[58] Field of Search .................. 74/625, 626, 405; 251/14

[56] References Cited

U.S. PATENT DOCUMENTS

| | | | |
|---|---|---|---|
| 4,034,624 | 7/1977 | Bianchini | 74/625 |
| 4,393,965 | 7/1983 | Zauyoulas | 74/625 X |
| 4,562,908 | 1/1986 | Zauyoulas | 74/625 X |
| 4,819,493 | 4/1989 | Dornan | 74/625 X |
| 4,895,048 | 1/1990 | Kay et al. | 74/625 |
| 4,921,207 | 5/1990 | Baker | 74/625 X |

*Primary Examiner*—Richard E. Moore
*Attorney, Agent, or Firm*—Burgess, Ryan & Wayne

[57] ABSTRACT

An electric drive with manual doubler comprises an electric motor (1), a frame (2), a sleeve (5), a lead screw (6), a sliding nut (10) eccentric to the axis of the lead screw (6), a gear wheel (12) eccentric to the axis of the lead screw (6). The gear wheel (12) is connected with the sliding nut (10), capable of restricted angular displacement with respect thereto, and is in engagement with a gear bush (13). This bush is arranged concentric with the lead screw (6) and rotatably mounted within the frame (2), the inner surface of the gear bush (13) serving as the datum surface for the lead screw (6). The electric drive comprises a manually operated hand wheel (15) rigidly coupled to the gear bush (13).

3 Claims, 1 Drawing Sheet

ELECTRIC DRIVE WITH MANUAL DOUBLER

FIELD OF THE INVENTION

The invention relates to devices designed to control the actuators with translation of the actuator rods, and more specifically, to electric drives with a manual doubler for controlling the pipe valves. The present invention can be most advantageously used in chemical, gas, oil-refining, wood-pulp and paper industries, in nuclear power engineering, ferrous and non-ferrous metallurgy, and other industries.

BACKGROUND OF THE INVENTION

Electric drives with a manual doubler feature the capability of the actuator being operated both from an electric motor and by manual control. The necessity of manual control is due, firstly, to operating conditions in the process of adjustment of pipeline systems and secondly, to possible alarm conditions occuring as a result of the power failure or the failure of electric control system components.

When designing electric drives for controlling pipe valves, special consideration is given to size reduction of the electric drives. This is due to the fact the force exerted by the power transmission is perceived by the gearings used in said electric drives, in operation, as a reaction. Such perception of the force by the gearing requires the size of this gearing to be increased, with the consequent increase in the overall dimensions of the entire electric drive, which are determined by the dimensions of said gearing.

Known in the art is an electric drive with a manual doubler, comprising a frame, a shaft mounted therein, and a pair of threaded elements in engagement, one of them being locked against rotation with respect to the frame, mounted coaxially with the shaft, and capable of axial desplacement, the second element being eccentric to the first one and freely rotatably mounted on the shaft. The two threaded elements combine to form a planetary-helical gearing.

As the threaded element freely supported by the shaft revolves around the stationary threaded element, a slip may occur that results from the frictional moment (force) at the contacting surfaces of the threaded elements being exceeded by the moment (force) of resistance. To avoid this slip, the device is provided with two gear wheels in engagement, one of them being stationary, the other one being located on the eccentric threaded element and adapted to be thrown into engagement with the first wheel. This combination represents a planetary-toothed gearing (SU,A, 992868).

One disadvantage of the above device is large dimensions of the planetary-toothed gearing caused by the reaction of the axial force transmitted being fully sensed by the planetary-toothed gearing. Besides, to ensure an off-line control of the actuator, both from an electric motor and manual, an additional mechanism is required that enables the kinematic chain to be switched over from mechanical to manual control, and vice versa.

Known is an electric drive with a manual doubler, comprising an electric motor, a frame, a sleeve mounted inside the frame, a lead screw, a sliding nut located inside the sleeve, in eccentric relation to the lead screw axis, a gear wheel eccentric to the lead screw axis, connected with the sliding nut, and being in engagement with a gear bush positioned concentrically with the lead screw and rotatably mounted inside the frame, and a manually operated handwheel rigidly coupled to the gear bush (SU, A, 636779).

In this device, the gear wheel is located on the sliding nut, the lead screw and the sliding nut forming, in combination, a planetary-helical gearing, the gear wheel and the gear bush forming a planetary-toothed gearing. The gear bush is locked relative to the frame by means of an adjustable locking device. In case the axial force is in excess of the force the locking device is adjusted to, the locking device enables the gear bush to be turned through in relation to the frame, thus preventing the actuator from being overloaded. The electric drive is disconnected.

One disadvantage of this device resides in the fact that said locking device fixing the gear bush within the frame is adjusted to a specified value of the force that can be only changed in the process of adjusting the device. This force is not connected with the axial force generated in the planetary-helical gearing, as the drive is operated, and fully sensed by the planetary-toothed gearing due to a rigid coupling between the two gearings. Consequently, the maximum force developed in the planetary-helical gearing, which is specified for the electric drive, is also fully sensed by the planetary-toothed gearing, resulting in larger overall dimensions of this gearing and hence, in an increased size of the entire device.

Besides, to ensure an off-line control of the actuator, either from the electric motor or manually, an additional switching mechanism is necessary for the device.

DISCLOSURE OF THE INVENTION

The principal object of the present invention is to provide an electric drive with a manual doubler, wherein the locking nut of the planetary-helical gearing and the gear wheel of the planetary-toothed gearing are so coupled as to relieve the planetary-toothed gearing of forces when they are at the highest in the final stage of the actuator operation, e.g. when packing the seal of the pipe valves, thus reducing the dimensions of said gearing and hence, the overall dimensions of the entire device, also avoiding the necessity of an additional mechanism for switching the electric drive from mechanical to manual control, i.e. providing an off-line operation of the device both from the electric motor and under manual control.

With this principal object in view there is provided an electric drive with a manual doubler comprising an electric motor, a frame, a sleeve located in the frame, a lead screw, a sliding nut placed within the sleeve eccentric to the lead screw axis, a gear wheel disposed eccentric to the lead screw axis, connected with the sliding nut, and being in engagement with a gear bush arranged concentric with the lead screw screw and rotatably mounted within the frame, a manually operated handwheel rigidly coupled to the gear bush, wherein according to the invention, said gear wheel and sliding nut are connected to each other so that they are capable of restricted angular displacement with respect to each other, and the inner surface of said gear bush represents the datum surface for the lead screw.

The connection of the gear wheel and the sliding nut subject to restricted angular displacement thereof with respect to each other allows rotation of the gear wheel relative to the sliding nut, when the forces in the planetary-helical gearing (lead screw/sliding nut) are at the highest, thereby disconnecting the gear wheel from the sliding nut and preventing transmission of the forces from the planetary-helical gearing to the planetary-toothed gearing. Thus, the planetary-toothed gearing is relieved of stress at the time of its maximum level, allowing the reduction of size of the gearing, and hence of the overall dimensions of the entire unit.

The use of the inner surface of the gearing bush as a datum surface for the lead screw provides, during operation of the device, a frictional moment to lock the gearing bush in place within the frame of the device. With the nominal load, this moment exceeds the moment developed in the lead screw/sliding nut pair, i.e. in planetary-helical gearing. Because of said locking of the gearing bush in the frame of the device, as the gear wheel revolves around the bush, the gear wheel maintains contact with the sliding nut of the planetary-helical gearing until the moment developed in the same exceeds the frictional moment locking the gearing bush in the frame of the device. When the moment is exceeded, the gear wheel will turn relative to the sliding nut of the planetary-helical gearing, breaking the contact between the planetary-helical and planetary-toothed gearings and relieving the planetary-toothed gearing of stress at the time of its maximum increase, reducing the size of the planetary-toothed gearing, and consequently, the overall dimensions of the unit as a whole.

It is advisable that the gear wheel and the sliding nut be linked by cams provided on the end faces of said gear wheel and sliding nut, the total angle contained by the two mated cams being required to be below 360°.

Such connection between the gear wheel and the sliding nut is most simple in design and adaptable to manufacture.

It is also advisable that the gear wheel and the sliding nut be mounted within the sleeve for radial movement with respect to each other.

The radial displacement of the gear wheel and the sliding nut with respect to each other substantially reduces the probability of extra overloads that might occur in operation of the device, thus minimizing the wear of the parts and raising the efficiency of the device.

BRIEF DESCRIPTION OF THE DRAWINGS

The present invention will be more clearly understood on consideration of the following detailed description of an embodiment of the electric drive with a manual doubler, according to the invention, with reference to the accompanying drawings, wherein.

BEST MODE TO CARRY OUT THE INVENTION

Figure 1:
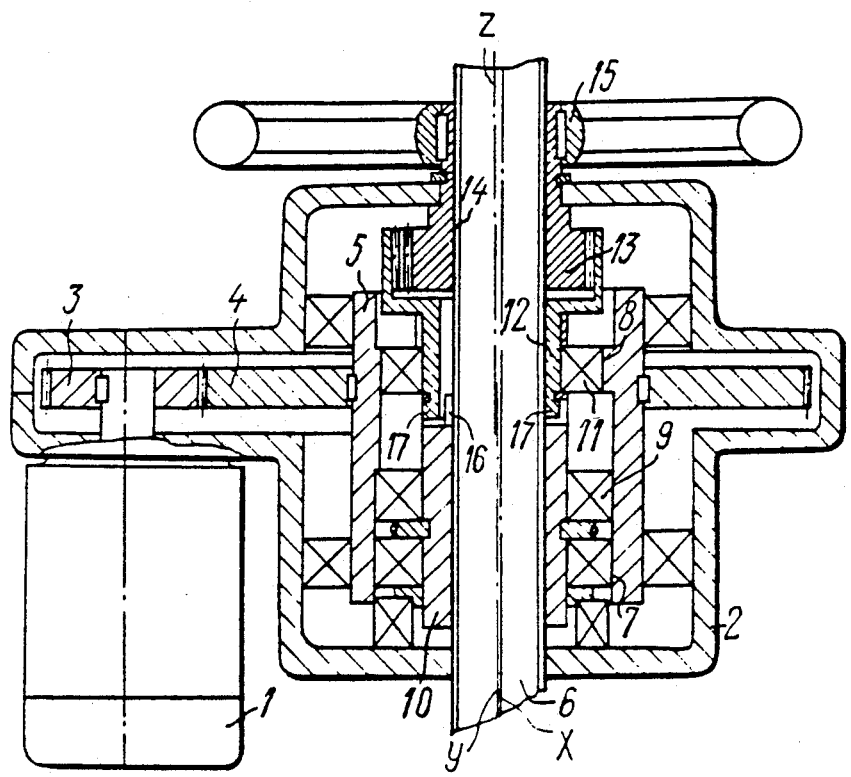
FIG. 1 is a sectional view of an electric drive with a manual doubler, according to the invention.
Figure 2:
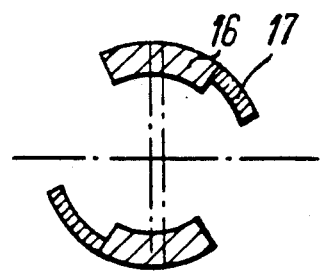
FIG. 2 is a cross-sectional view of the gear wheel and the sliding nut at the point of the cam joint.

The electric drive with manual doubler comprises an electric motor 1 mounted on a frame 2. The electric motor 1 is coupled with a sleeve 5 by a pair of gears 3 and 4. Placed within the frame 2 is a lead screw 6 locked against the rotation (the locking means not shown in the drawings for clarity). In the sleeve 5, there are provided cylindrical bores 7 and 8 arranged eccentric to the axis X of the lead screw 6. The eccentricities of the bores 7 and 8 of the sleeve 5 having the axes Y and Z, respectively are made different.

Mounted in the bore 7 of the sleeve 5 by means of bearings 9 is a sliding nut 10 kinematically coupled with the lead screw 6 to form a planetary-helical gearing.

Mounted in the bore 8 of the sleeve 5 by means of bearings 11 is a gear wheel 12 engaged with a gearing bush 13 concentric to the lead screw 6. The gear wheel 12 combines with the gearing bush 13 to form a planetary-toothed gearing.

The location of the sliding nut 10 and the gear wheel 12 in the bores 7 and 8, respectively, having different eccentricities permits the radial displacement of the sliding nut 10 and the gear wheel 12 with respect to each other, reducing the probability of extra overloads in operation, minimizing the wear of the parts, and increasing the efficiency of the device.

An inner surface 14 of the gearing bush 13 is made as the datum surface for the lead screw 6 mounted within the gearing bush 13, so that during operation of the device, the gearing bush 13 is locked in place within the frame 2 of the device, due to a frictional moment developed between the bush and the lead screw 6. A manually operated handwheel 15 is rigidly atached to the gearing bush 13.

The sliding nut 10 of the planetary-helical gearing is coupled with the gear wheel 12 of the planetary-toothed gearing for angular displacement with respect to each other. This connection is realized by means of cams 16 provided on the end face of the sliding nut 10, and by means of cams 17 provided on the mating end face of the gear wheel 12 and brought into engagement with the cams 16. The total angle contained by the mated cams 16 and 17 is under 360°, providing an angular clearance between the cams 16 and 17.

The operation of the electric drive with manual doubler now follows.

When the electric motor 1 is actuated, the rotation is transmitted to the sleeve 5 through the pair of gears 3 and 4. Now the sliding nut 10 supported by the bearings 9 within the bore 7 of the sleeve 5 revolves around the lead screw 6 due to its eccentric position with respect to the axis X of the lead screw 6 and simultaneously rotates about its own axis Y offset from that of the lead screw 6 by the amount of eccentricity. These movements of sliding nut 10 both result in the translational displacement of the lead screw 6. The gear ration of the planetary-helical gearing including the sliding nut 10 and the lead screw 6 is given by $$i_1 = \frac{D_{ang\,10}}{D_{ang\,10} - D_{ang\,6}} = \frac{D_{ang\,10}}{2E}$$

where $i_1$: gear ratio of planetary-helical gearing;

$D_{ang\,10}$: angle diameter of the thread of the sliding nut 10;

$D_{ang\,6}$: angle diameter of the thread of the lead screw 6;

E: eccentricity.

Along with transmission of rotation from the sleeve 5 to the sliding nut 10, this rotation is transmitted to the gear wheel 12 disposed within the bore 8 of the sleeve 5. The gear wheel 12 then revolves around the gearing bush 13 locked inside the frame 2 by virtue of a frictional moment developed during operation of the electric drive. This locking effect is provided by making the inner surface of the gearing bush 13 act as the datum surface for the lead screw 6. The gear ratio of the planetary-toothed gearing including the gear wheel 12 and the gearing bush 13 is given by:

$$i_2 = \frac{z_{12}}{z_{12} - z_{13}}$$

where:
- $i_2$: gear ratio of planetary-toothed gearing;
- $z_{12}$: number of teeth of gear wheel 12;
- $z_{13}$: number of teeth of gearing bush 13.

As the lead screw 6 is translated with a nominal load, the cams 16 of the sliding nut 10 and the cams 17 of the gear wheel 12 contact each other, provided the gear ratio $i_2$ of the planetary-toothed gearing exceeds the gear ratio $i_1$ of the planetary-helical gearing. In this case, the revolution rate of the gear wheel 12 in the planetary-toothed gearing will exceed that of the sliding nut 10 in the planetary-helical gearing. As a result, the sliding nut 10 is somewhat braked, causing it to slip relative to the lead screw 6. This slip will essentially produce no effect on the operation of the drive at rated loads.

As the working force increases in the process of controlling the actuator, the radial force in the planetary-helical gearing is also increased, causing the sag of the lead screw 6 to grow and the eccentricity of the sliding nut 10 to fall. Also the gear ratio of the planetary-helical gearing is increased and the speed of rotation of the sliding nut 10 with the cams 16 about its axis reduced (the speed of revolution of the sliding nut 10 around the lead screw 6 remaining unaltered). On the other hand, the speed of revolution of the gear wheel 12 with the cams 17 around the gearing bush 13 is not changed.

The gear ratio of the planetary-helical gearing is made equal to that of the planetary-toothed gearing, i.e. $i_1 = i_2$. The slip of the sliding nut 10 with respect to the lead screw 6 no longer occurs. The cams 16 and 17 still contact one another.

A further increase of the load at the lead screw 6 brings about its greater sag, a higher gear ratio $i_1$, of the planetary-helical gearing and the consequent reduction of the speed of rotation of the sliding nut 10 about its own axis. On account of the velocity of the sliding nut 10 being reduced, its cams 16 are disconnected from the cams 17 of the gear wheel 12, and the cams 16 and 17 continue to move at different speeds in the same direction, within the specified angular clearance, until the contact between the opposite surfaces of said cams is recovered. Subsequently, the cams 17 of the gear wheel 12 begin to be followed by the cams 16 of the sliding nut 10. In so doing, the sliding nut 10 and the lead screw 6 interact as an ordinary screw pair, i.e. the planetary-helical gearing takes no part in transmission of the forces to the actuator through the planetary-toothed gearing. The power from the electric motor is transmitted through the planetary-toothed gearing to the actuator.

Subsequent increase of the load at the lead screw, for example, at the initial stage of sealing the valve gate, contributes to raising the force in the planetary-helical gearing. When the force of locking the gearing bush 13 in the frame 2 is exceeded by that force, the gearing bush 13 will turn, along with the gear wheel 12, in the frame 2 through a certain angle not exceeding the angular clearance between the cams 16, 17. This turn of the gearing bush 13 in the frame 2 causes the cams 16 and 17 to be disengaged and the planetary-toothed gearing to be relieved of stress. The electric motor power will be then transmitted through the sliding nut 10 to the lead screw 6 that now interact to form a planetary-helical gearing with an increased gear ratio, transmitting a greater force to the actuator, while the planetary-toothed gearing is fully relieved of stress. Subsequent increases of loads on the lead screw 6, up to the maximum levels specified for the drive, involve repeated actions as described above till the valve gate is completely shut.

Thus, in the range of maximum forces exerted on the actuator, the above loss and recovery of contact between the cams 16 and 17 and consequently, between the planetary-helical and planetary-toothed gearings will be pulsed in nature corresponding to the slight turn of the manually operated handwheel 15.

So, the above mechanism of interconnection of the planetary-helical and the planetary-toothed gearings results in the loss of coupling between them at the point of maximum forces occurring in the actuator, so that this force is only sensed by the planetary-helical gearing. This enables the planetary-toothed gearing to be made of a smaller size, and hence the overall dimensions of the entire electric drive are reduced.

If it is necessary to control the actuator using the manual control, the electric motor 1 is switched off. Then the handwheel 15 and its associated gearing bush 13 and gear wheel 12 are rotated. The cams 17 of the gear wheel 12 and the cams 16 of the sliding nut 10 being in engagement allow rotation of the sliding nut 10 about the lead screw 6. Since the sleeve 5 does not rotate, the sliding nut 10 is prevented from revolving around the lead screw 6, but they rather interact to form a typical screw pair, providing a high output velocity of the lead screw 6.

If the electric motor 1 is inadvertently switched on under control of the manually operated handwheel 15, the safety operation is guaranteed due to the lack of a rigid kinematic coupling between the mechanical and manual control elements.

INDUSTRIAL APPLICABILITY

The present invention can be most advantageously used in chemical, gas, oil-refining, wood-pulp and paper industries, as well as in nuclear power engineering, in ferrous and non-ferrous metallurgy, and in other industries, to control actuators of the pipe valves with translation of rods of said actuators.

We claim:

1. An electric drive with manual doubler, comprising an electric motor, a frame, a sleeve located in the frame, a lead screw, a sliding nut placed within the sleeve eccentric to the lead screw axis, a gear wheel arranged eccentric to the lead screw axis, connected with the sliding nut, and being in engagement with a gear bush arranged concentric with the lead screw and rotatably mounted inside the frame, a manually operated handwheel rigidly coupled to the gear bush, characterized in that said gear wheel and sliding nut are interconnected and capable of restricted angular displacement with respect to each other, and the inner surface of said gear bush serves as the datum surface for the lead screw.

2. An electric drive of claim 1, characterized in that the gear wheel and the sliding nut are interconnected by means of cams provided on the end faces of said gear wheel and sliding nut, the total angle contained by the mated cams being less than 360°.

3. An electric drive of claim 1, characterized in that the gear wheel and the sliding nut are mounted in the sleeve and capable of being radially displaced with respect to each other.

* * * * *